United States Patent
Unruh et al.

[11] Patent Number: 6,059,998
[45] Date of Patent: May 9, 2000

[54] ELECTROSTATIC DISSIPATIVE SUBSTRATE MATERIALS

[76] Inventors: Greg Roland Unruh, 3429 Cinderella La., Amarillo, Tex. 79121; Dana M. Lindsey, 2620 15th Ave., Canyon, Tex. 79015

[21] Appl. No.: 09/058,027

[22] Filed: Apr. 10, 1998

[51] Int. Cl.[7] .............................. H01B 1/00; B32B 15/08
[52] U.S. Cl. ........................... 252/500; 428/461; 428/518
[58] Field of Search ..................................... 252/500, 518, 252/519, 510; 428/461, 518, 922

[56] References Cited

U.S. PATENT DOCUMENTS

| | | | |
|---|---|---|---|
| 4,438,251 | 3/1984 | Herweh | 528/73 |
| 4,604,427 | 8/1986 | Roberts et al. | 528/185 |
| 4,711,742 | 12/1987 | Jen et al. | 252/500 |
| 4,755,326 | 7/1988 | Liepins et al. | 252/518 |
| 4,872,910 | 10/1989 | Eshleman et al. | 106/3 |
| 5,320,780 | 6/1994 | Unruh | 252/500 |
| 5,624,605 | 4/1997 | Cao et al. | 252/500 |

FOREIGN PATENT DOCUMENTS

| | | |
|---|---|---|
| 2148915 | 6/1985 | United Kingdom . |

*Primary Examiner*—Mark Kopec
*Assistant Examiner*—Derrick G. Hamlin
*Attorney, Agent, or Firm*—William D. Jackson; Locke Liddell & Sapp LLP

[57] ABSTRACT

A process for the preparation of a static dissipative material from a substrate material formed of a thermoformable polymeric matrix of low electrical conductivity. The substrate material is contacted with a solution of an aniline-based monomeric or oligomeric conductant which is selected from the group consisting of aniline and substituted aniline components. The aniline-based conductant is dissolved in a solvent and maintained in contact with the substrate material for a period of time to permit at least partial infusion of the conductant into the polymeric matrix. Subsequent to the contact step, the substrate material is subjected to a curing step in which the aniline-based segments introduced into the polymeric matrix are at least partially polymerized. The polymerization of the infused aniline segments can be carried out in an oxidizing environment or by subjecting the infused substrate material with electromagnetic radiation in the ultraviolet range. A static dissipative material comprises a substrate material, such as a flexible film as described above, having an aniline-based constituent material selected from the group of aniline and substituted aniline groups infused into the polymeric matrix. The aniline constituents are at least partially polymerized to provide a surface resistivity of no more than $1 \times 10^8$ ohms/sq. Packaging of an electronic component, such as a circuit board integrated circuit, within a flexible film is prepared by contacting a heat-processable and shrinkable film formed of a thermoformable polymeric matrix with a solution of aniline-based monomeric or oligomeric conductant. The film product is then heated and allowed to cool to provide a shrink-wrapped electronic component.

16 Claims, No Drawings

ELECTROSTATIC DISSIPATIVE SUBSTRATE MATERIALS

FIELD OF THE INVENTION

This invention relates to thermoformable electrostatic dissipative materials incorporating thermoplastic polymers having infused aniline-based conductive moieties and more particularly to polymeric compositions which can be thermoformed to produce flexible plates, films, fibers, and the like and methods for the preparation of such materials.

BACKGROUND OF THE INVENTION

There are various applications in which so-called electrostatic dissipative (ESD) products are desirable. Such products are useful in the manufacturing and use of electronic equipment where sensitive electrical components accumulate static charges which can interfere with their operation or actually cause damage to such components. Similarly in the use or manufacture of electronic equipment, accumulation of static charges on substrate surfaces such as floors, workbenches, cabinets and the like which might be imparted to such equipment in the course of normal operations, can lead to serious problems. Another application is in the use of thermoplastic polymers which can be thermoformed by extrusion-blowing and the like to produce fibers and thin films are sheets which have electrostatic dissipative characteristics.

Various formulations incorporating complexes formed from metal salts in a polymer matrix have been proposed in order to provide electrically conductive surface layers or films which can function to prevent the buildup of static charges on surfaces or dissipate charges transferred from other bodies. The metal ions may be introduced by means of a suitable dopant moiety which imparts the desired conductive characteristics to the polymer matrix. The use of such dopants to introduce trace impurities into polymer matrixes or structures is well known in the art.

An antistatic polymeric composition useful as a floor polish is disclosed in U.S. Pat. No. 4,872,910 to Eshleman et al. Here, various alkali metal or alkali earth metal salts are employed in conjunction with acryloid-type polymer materials in a polyalkylene oxide complex with the metal ions. By way of example, polyethylene oxide or polypropylene oxide can be used to form a complex with various halides, thiocyanates, acetates or nitrates of lithium, sodium or potassium or magnesium, calcium or strontium. Polymers and surfactants can be incorporated into the formulation as well as the alkali metal or alkali earth metal-polyalkylene oxide complex. For example, polymers which can be incorporated into the Eshleman et al formulation include polyurethanes, acrylate copolymers, acrylic acid terpolymers, polyvinyl alcohol, polyethylene glycol, styrene-maleic anhydride copolymers, together with nonionic surfactants and plasticizers and various other additives. In the Eshleman formulation the preferred metal salt is a lithium salt, specifically, lithium chloride.

Another formulation, in which polymers are treated with an electron donor dopant to provide electrically conductive films, is disclosed in U.S. Pat. No. 4,755,326 to Liepina et al. Here an electride or alkalide, characterized respectively as a salt in which the anion is a trapped electron or an alkali metal anion, incorporating "trapping agent" which may be a podand, cryptand or coronand. Specifically, a crown-ether such as 18-crown-6 is employed. While in the Liepina formulation, the preferred metal for use in the electron donor dopant is cesium, other alkali metals are identified as useful and include lithium, sodium, potassium and rubidium. In addition, lithium may be used in conjunction with cesium. The polymer which is subject to the dopant may be polyactylene or a polyaromatic heterocyclic polymer which in the unmodified (non-doped state) is electrically non-conductive. Polymers disclosed as useful in Liepina include polyquinoxalines, polybenzimidazoles, polybenzoxazoles, polybenzthiazoles, polyoxadiazoles, polybenztriazoles and polysulfodiazoles. Specifically, disclosed are polymer structures derived from Pyrrone I, Pyrrone II, and polyphenylquinoxaline. The Liepina formulation involves a doping procedure which is carried out in a vacuum system, followed by vacuum distillation and drying to effect the curing action, resulting in cured film thickness ranging from 50 to 100 microns and ranging as reported in Table I of the patent from bright purple to black.

U.S. Pat. No. 4,711,742 to Jen et al discloses solutions having as ingredients, film forming homopolymers or copolymers, organic solvents and electron acceptor dopant solutes although electron donor dopants can also be used. Numerous polymers and organic solvents are disclosed in Jen et al as useful in forming the conductive films. Such polymers include various polymers of the teropentacyclic such as furans and thiofurons substituted with alkyl, aryl, or thio-, carboxyl, or sulfonic acid substituted alkyls or aryls or other function groups. Various solvents included sulfones, alkyl alkane sulfonates, flrans, ethers, and aliphatic or aromatic hydrocarbon solvents. A large number of electron acceptor dopants are disclosed including various halogens, chlorates, nitrates, sulfites, tri- and tetra-halides, and perchlorates, including lithium perchlorate.

Other formulations disclosed in U.S. Pat. No. 4,438,251 to Herweh are based upon polyurethane polymers which are modified to incorporate macrocyclic ether moieties into the polymer backbone. Specifically disclosed are polyurethane-based polymers incorporating dibenzyl-substituted crown ethers, such as 18-crown-6, into the polymeric backbone. The resulting polymer products are then doped to provide cationic moieties such as potassium ions in a guest/host complex with the crown ether segment of the polymer chain. By way of example, various diphenyl substituted crown ethers, such as diphenylene 18-crown-6, diphenylene 12-crown-4, and diphenylene 24crown-8, may be employed in reaction with diisocyanates. Specifically disclosed in is a compound such as the reaction products of dibenzo-18-crown-6 diols with methylene bis(4-cyclohexyl isocyanate) followed by doping of the resulting polymer with potassium 7,7,8,8-tetracyanoquinodimethane (TCNQ).

Another approach to alleviate the adverse effects of electrostatic discharge involves the application of a protective coating to a non-conductive substrate to render it conductive or static dissipative as disclosed, for example, in British Patent No. 2148915A to Berbeco. As disclosed in Berbeco, ionic conduction is employed through application of a humidity-dependent coating in which small amounts of moisture are present to allow for the migration of ions and, hence, the overall flow of electrons. Such ionic conductive-based coatings can be characterized as conductive having a resistance of $1-10^5$ ohms per square or static dissipative having a specific resistance of $10^5-10^{12}$ ohms per square. Another system involving the use of static dissipative self-protonating polymeric composition that are humidity-independent is disclosed in U.S. Pat. No. 5,320,780 to Unruh. As disclosed in Unruh, an aromatic-based conductive polymer system can be employed to provide a polymeric formulation which can be applied to a substrate material and which is humidity-independent. As disclosed in the Unruh '780 patent, various polyaniline-based polymers can be employed to provide conductive polymer systems which can be applied to a substrate material to provide an end product having a resistivity within the range of about $10^5$–$10^{12}$ ohms/square. Specifically disclosed is a self-protonating conductive polymer which can be a sulfonated or phosphated aromatic unsaturated hydrocarbon which is nitrogen bridged and which is employed in conjunction with an acrylic emulsion and polyethylene emulsions and a glycol ether together with a plasticizer. Specifically disclosed in the '780 patent are various polyanilines and sulfonated or phosphated polyanilines, the former being preferred, resulting in a product which, when applied to a substrate surface, results in a humidity-independent film.

SUMMARY OF THE INVENTION

In accordance with the present invention there is provided a process for the preparation of a static dissipative material from a substrate material formed of a thermoformable polymeric matrix of low electrical conductivity. In carrying out the invention, the thermoplastic polymeric substrate material is contacted with a solution of an aniline-based monomeric or oligomeric conductant which is selected from the group consisting of aniline and substituted aniline components. The aniline-based conductant is dissolved in a lipophilic or amphophilic solvent, and the solution maintains contact with the substrate material for a period of time to permit at least partial infusion of the aniline-based conductant into the polymeric matrix. Contact between the dispersion and the substrate material preferably is provided by immersing the substrate material within the solution for a period of at least 2 minutes.

Subsequent to the immersion step, the substrate material is withdrawn, preferably dried for a period of time to remove residual solvent from the surface and then subjected to a curing step in which the aniline-based segments introduced into the polymeric matrix are at least partially polymerized. Preferably, the substrate material containing the aniline-infused conductant is subjected to a oxidizing environment for a period of time sufficient to provide the resulting product of enhanced electrical conductivity.

In a specific application of the invention, the original substrate material exhibits a surface resistivity of more than $1\times10^9$ ohms/sq. or more and usually at least $1\times10^{12}$ ohms/sq., and the surface resistivity of the substrate material at the conclusion of the oxidizing or other polymerization procedure is no more than $1\times10^8$ ohms/sq.

As noted above, preferably the polymerization of the infused aniline segments is carried out by placing the product in an oxidizing environment. Alternatively, in another embodiment f the invention, polymerization or partial polymerization of the aniline segments can be affected by subjecting the infused substrate material with two electromagnetic radiation, preferably electromagnetic radiation in the ultraviolet range.

The aniline-conductant material preferably is aniline which has been functionalized with at least one hydrocarbon group or ether-linked hydrocarbon group and/or functionalized with an ionic group. Preferably, the aniline segment is functionalized with an anionic group selected from the group consisting of sulfonates, phosphonates, and carboxylates.

Preferably, the substrate material employed in the present invention is a thermoformable film having a thickness within the range of 10–40 mils. Preferably, the thermoplastic polymer employed in carrying out the present invention is selected from the group consisting of polyethylene terephthalate, glycol-modified polyethylene terephthalate, polyvinyl chloride, polyacrylonitrile resin, polycarbonate resin, and polyamide resin. In a specific application of the present invention, the substrate material is a flexible transparent film formed of glycol-modified polyethylene terephthalate.

In a further application of the present invention, there is provided a static dissipative material which comprises a substrate material, preferably a flexible film as described above. The substrate material is formed from a thermoplastic polymer selected from the group consisting of polyethylene terephthalate, glycol-modified polyethylene terephthalate, polyvinyl chloride, polyacrylonitrile resin, polycarbonate resin, and polyamide resin. An aniline-based constituent material selected from the group of aniline and substituted aniline groups is infused into the polymeric matrix. The aniline constituents are at least partially polymerized, that is, the aniline or substituted aniline groups are at least partially incorporated into a polymer structure which is incorporated to or at the surface of the substrate material resulting. A polymerized or partially polymerized aniline constituent provides a surface resistivity of no more than $1\times10^8$ ohms/sq.

In accordance with yet another aspect of the invention, there is provided a process for the packaging of an electronic component. In carrying out this embodiment of the invention, the electronic component, such as a circuit board, integrated circuit, or the like, is at least partially enclosed within a flexible film. The flexible film is prepared by the process of contacting a heat processable and shrinkable film formed of a thermoformable polymeric matrix with a solution of aniline-based monomeric or oligomeric conductant selected from the group consisting of aniline or substituted aniline in a lipophilic or amphophilic solvent. The film is maintained in contact with the solution for a period of time to permit at least partial infusion of the aniline segments into the thermoplastic polymeric matrix. Thereafter, the film containing the infused aniline segments is subjected to oxidation or to an environment involving electromagnetic radiation within the ultraviolet range or oxidation for a period of time sufficient to provide a film of enhanced electrical conductivity. The resulting film product is then heated and allowed to cool to provide a shrink-wrapped electronic component.

DETAILED DESCRIPTION OF THE INVENTION

The present invention provides static dissipative materials and methods for their preparation which involve thermoformable polymers which are infused with aniline-based conductive moieties to make them highly conductive and which can be subject to conventional thermoforming operations, such as extrusion to form fibers, blowing to form flexible films, to sheeting operations to form relatively thick flexible sheets. Thermoplastic polymers such as polyurethanes and polyethylene terephthalates and other ethylene glycol-based aromatic polyesters find application in various thermoforming operations. Exemplary of such operations are injection molding to produce flexible, shaped particles, extrusion to form various fibrous materials, and filming operations to produce flexible films. Such products are used in applications involving electronic equipments or as containers or wrappings for electronic equipment. They desirably are made to be electrostatic dissipative in order to avoid the buildup of static electricity. One approach to providing protection against electrostatic charge accumulation is through the use of a conductive coating on the surface of a substrate film. For example, thermoformable polymers are often used to package electronic components which are sensitive to electrostatic charges. In order to provide ESD protection, a film of a packaging material, such as a film of polyethylene terephthalate, can be provided with conductive coatings of the various types as described previously. While such a conductive coating can provide an effective means for the dissipation of electrostatic charges in many circumstances, the application of such coatings to flexible films and other flexible members is subject to limitations due to the flexibility of the underlying substrate material. Breakage in the conductive coating can result in a loss of continuity so that the protective coating is not effective in avoiding the electrostatic buildup.

The present invention involves the infusion of a aniline-based conductant into a polymeric matrix which in itself is of a low electrical conductivity of high specific resistivity, or stated otherwise of high specific resistivity, in a manner to provide a film or other substrate material which is highly conductive. The aniline-based conductive moiety can be aniline, an aniline oligomer, usually of only a few monomer groups and specifically no more than 3 monomer units, or a substituted aniline which has been functionalized either to impart anionic, nonionic, or cationic functional groups or to incorporate hydrocarbon functional groups which aid in infusion of the conductant into the polymeric matrix. As described below, the aniline monomers (or oligomers, although oligomers as described later can be employed, in the invention will be described primarily with the use of monomers) can be neutral alkylated monomers or self-protonating aniline monomers typically carboxylated or sulfonated derivatives. Suitable neutral anilines conductive moieties which can be employed in the present invention include aniline itself, 2,6-dimethylaniline, 2-phenoxyaniline, 2-alkyanilines in which the alkyl group contains from 1 to 7 carbon atoms, dialkylanilines, such as 2,3-dimethylaniline, and 2-methoxyphenyl ethers of aniline. Self-protonating aniline monomers useful as conductive moieties in the present convention include sulfonated and carboxylated aniline, sulfonated or carboxylated alkoxyanilines, or sulfonated or carboxylated methylanilines. Specific examples of such self-protonating aniline monomers include ortho aminobenzoic acid, ortho aminobenzenesulfonic acid, 2-methoxy-m-benzenesulfonic acid, 2-ethoxy-p-aminobenzenesulfonic acid, and 4methyl-o-benzenesulfonic acid.

Polyethylene terephthalate, glycol modified (PETG), is a commonly-used packaging material which is adapted for blister packaging due to its extreme degree of elongation upon heating and applied tensile stress. PETG has a moderate glass transition temperature (Tg) which enables biaxial orientation of the film upon heating at moderate temperatures within the range of 80–150° F. PETG is characterized by the following structural formula:

N is typically within the range of 20–50.

In order to be used in electronics packaging applications, PETG should be made static dissipative or antistatic due to the sensitive nature of electronics components to the electrostatic discharge event. Electrostatic discharge is a common and highly destructive phenomenon in modern industry, especially the electronics industry. Electrostatic discharge is defined in the U.S. Military Handbook DOD-HKPK-263 as a transfer of electrostatic charges between bodies at different potentials by direct contact or induced by an electrostatic field. Electrostatic charge can build up on non-conductive materials as the result of the capture or release of electrons. If voltage potentials are large enough, arcing can occur between two objects, releasing large amounts of energy relative to the sensitive components such as integrated circuits, etc. Passing a conductive material close to a nonconductive material that has been charged can induce a current in the conductor.

As discusssed in the aforementioned U.S. Pat. No. 5,320,780, the process of ESD can began when workers who handle static-sensitive electronics components report to work wearing a pair of crepe-soled shoes and proceed to walk across non-conductive floors in factories where the humidity cannot not be controlled. As the humidity drops below 20%, the workers, just walking to their bench, would build up a static electric charge on their bodies, as shown in Table I of the '780 patent.

This is known as the "triboelectric effect." As the workers walk, the higher the charge, and the stronger the field around their bodies. As they arrive at their workbench, which might contain several static sensitive devices, the static field around their bodies induces current flow in these devices destroying them. The susceptibility of various electronic components to ESD is reported in Table 2 of the aforementioned '780 patent. As described there, the various solutions to ESD susceptibility involve making a nonconductive substrate or area conductive so that charges can be dissipated and the "triboelectric effect" can be minimized. In light of the potential damage ESD can cause to electronic components, various ESD protective coatings have been developed to be applied to non-conducting substrates to make them conductive or static dissipative.

A substrate that is conductive has an electrical resistivity in the range of about $1-10^5$ ohms/sq., whereas a substrate that is static dissipative has a surface resistivity in the range of $10^5-10^{12}$ ohms/sq. Within the conductive or static dissipative range, static potentials may be dissipated without harming the electronic component. However, a substrate with an electrical resistivity in the conductive range may pose harm to operating personnel. Further, a substrate with an electrical resistivity of greater than $10^{12}$ ohms/sq is considered to be insulative and highly destructive with respect to electronic components. For a further description of the phenomena of electrostatic discharge, reference is made to the aforementioned U.S. Pat. No. 5,320,780 to Unruh, the entire disclosure of which is incorporated by reference.

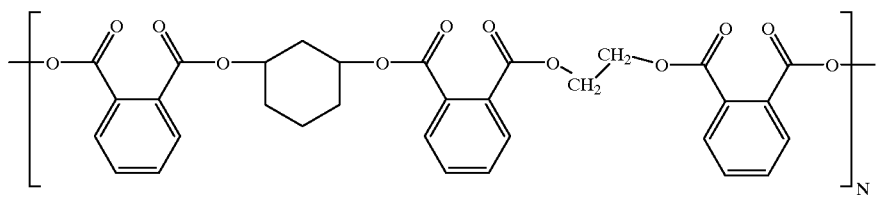

As noted in the '780 patent, common types of static dissipative plastics and/or coatings contain migratory or polymer-bound antistats whose mode of conduction is ionic (i.e. trace amounts of water must be present for conduction to occur). There are three basic types of antistats described with respect to charge configuration. The three charge types are cationic, anionic, and nonionic as shown below:

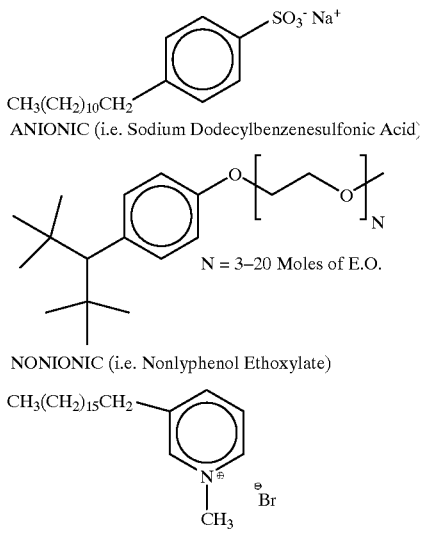

There is a problem that is apparent with static dissipative packaging materials containing migratory antistats—that being that the mechanism of conduction is ionic in nature and therefore dependent upon humidity parameters as small amounts of moisture are required for the migration of ions and hence the overall flow of electrons. Coatings containing migratory antistats are usually made up of surface active agents, molecules with a lipophile or "oil-loving" tail, and a polar, hydrophilic, or "water-loving" end. As the coating cures, or cools down, the lipophilic end lines itself up with the inner coating matrix (the lipophilic acrylic polymer) while the polar end migrates toward the surface of the coating providing the conductive layer. The polar end of the antistat hydrogen bonds to water molecules present in the original emulsion or from the air forming a conductive layer on the surface. However, when the relative humidity drops below 20%, more water molecules are driven off into the air and the coating loses conductivity.

To overcome this problem, many plastics are filled with intractable carbon black, antimony doped tin oxide or doped barium sulfate materials. The major disadvantage of these types of materials is that they exhibit "sloughing" characteristics and clarity problems. A problem inherent to carbon black is that the material can actually become "overconductive".

The present invention is applicable to various commercially-available thermoplastic polymers such as PETG, PVC, polycarbonate, acrylics, nylon and ABS, which are subject to ESD. The invention involves diffusion techniques to impregnate the surface and surface layers of these plastics with "pre-conductive" monomers and subsequently oxidizing them to a conductive polymeric form using chemical or ultra-violet light techniques.

The present invention may be contrasted to the use of various processes employing polyaniline to impart humidity dependence in static dissipative polyethylene terephthalate glycol-modified (PETG). One technique involves the use of polyaniline to impart conductivity to thermally-formable PETG. This technique can also be used with other thermoplastic resins or polymers such as polyvinyl chloride, polycarbonate, and polyacrylate through application of different diffusion media and counteranions. The counteranion can be selected to control the solubility of various plastics as well as to impart desired thermal stability.

Polyaniline is a well-known conjugated polymer and has attracted much interest because it is reasonably stable toward water and oxygen and has very attractive electrical and optical properties. Polyaniline is represented by the following general formula:

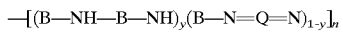

where B denotes a benzenoid-reduced unit and Q, a quinoid-oxidized unit. This is structure (A) in the structural formulas shown below. The polyaniline segments exist in three discrete oxidation levels, corresponding to the case where y=1 (leucoemeraldine), y=0.5 (emeraldine), or y=0 (pernigraniline). All the other average oxidation states are a mixture of any two of these oxidation states. The emeraldine base form (A) is interesting since it may undergo reversible protonic acid doping, as shown below. This produces reversible changes in the electrical and optical properties. Structure (C) represents the emeraldine salt form. It is conducting and is produced directly from the electrochemical or chemical oxidation of aniline in aqueous acidic conditions. The emeraldine base (A) is insulating and is produced by the deprotonation of the aqueous emeraldine salt in aqueous basic conditions.

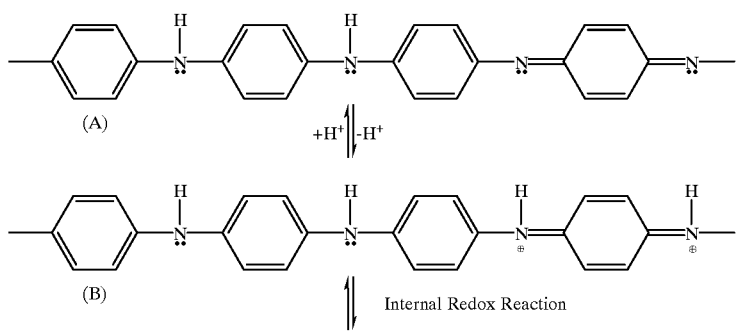

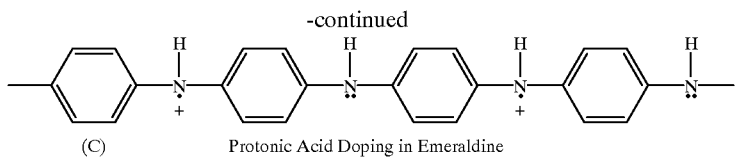

(C) Protonic Acid Doping in Emeraldine

Polyaniline can be made, treated with the appropriate counter anions, and then mixed chemically through solvent processes or co-extruded with various plastics to make them conductive. When using polyaniline in this manner (the polymerized doped form), it is hard to control dispersion and migratory parameters during casting or extrusion, resulting in non-homogenous and sometimes films with poor clarity.

Polyaniline can be applied or grafted to plastic surfaces which have amino- or sulfonic-acid groups by placing the plastic sheet in an aqueous solution of the monomer and appropriate counter ion and then treating with the appropriate oxidants. Even though this method can be used to form a clear conductive coating on the plastic, it usually is not bonded (grafted) or adhered (ionically bonded) to the surface. Unless amino or sulfonic acid groups are present, grafting or ionic bonding, respectively, cannot take place.

The present invention provides an alternative approach involving the use of diffusion techniques. The invention will be described in detail with respect to PETG although, as noted previously and as described below, it is also applicable to polyamides, such as Nylon 6, polyvinyl chlorides, polycarbonates, and polyacrylics. The following detailed description will be made with respect to diffusion techniques involving thermoformable PETG which results in incorporation of a permanent polyaniline-infused coating within the matrix of the PETG or other thermoplastic substrate material.

In this experimental work, transparent and highly conductive films of PETG were prepared by immersing PETG sheets in solvent carriers containing aniline and 2,3-dimethyl aniline monomers. This techniue can be used for the various alkyl isomers of aniline as long as the proper oxidants are employed for fixed amounts of time, removing them and then exposing them to aqueous acidic oxidizing solutions for various amounts of time.

Careful consideration should be given to the interaction between the polymer matrix and monomer, because the low molecular weight solvent combinations are capable of inducing physical modifications in the solid polymer, such as reversible swelling, irreversible microfailure, induced crystallization and even dissolution. There are certain preferred reaction conditions for desired clarity, minimum color, and conductivity vs. the mechanical properties of the matrix as described below.

As described in greater detail below, various solvents' diffusion times, oxidant solutions, and oxidation times can be employed in carrying out the present invention. The parameters indicated by the following experimental work are generally preferred in the carrying out the present invention where the polymeric matrix is provided by PETG.

In this experimental work 32—1"×3" strips of 0.01" LUSTRO™ PETG were cut, washed with methanol and air dried at room temperature and pressure. Eight strips were submersed at room temperature with stirring in each of the four solutions listed in Table 3 for the amounts of time listed in Table 4.

TABLE 3

| | DIFFUSION SOLUTIONS | | | |
|---|---|---|---|---|
| SOLUTION #/INGRED. | 1 | 2 | 3 | 4 |
| n-Hexane | 180 ml. | 180 ml. | 180 ml. | 180 ml. |
| Acetone | 30 ml. | 20 ml. | — | — |
| Ethyl Ether | — | — | 120 ml. | 120 ml. |
| FC-430 (Fluorosurfactant) | 0.2 g. | 0.2 g. | 0.2 g. | 0.2 g. |
| Aniline (freshly distilled) | 4 ml. | 4 ml. | 4 ml. | 4 ml. |
| 2,3-Dimethylaniline | — | 1 ml. | — | 1 ml. |

TABLE 4

8 - 1" × 3" Strips for Each Diffusion Solution (32 total)

Submersion Time for Strips

2 @ 30 Minutes
2 @ 1 Hour
2 @ 1.5 Hours
2 @ 2 Hours

After submersion for the allotted times the strips were removed and air dried at room temperature and pressure for 30 minutes, and then one of each type of strip (with respect to diffusion time parameters) were exposed to two different oxidant solutions (Ammonium persulfate or Ceric ammonium nitrate Table 5. For various amounts of time (Tables 6 and 7).

TABLE 5

| OXIDANT SOLUTIONS | #1 | #2 |
|---|---|---|
| Deionized Water | 180 ml. | 180 ml. |
| 37% HCl | 20 ml. | 20 ml. |
| $(NH_4)_2S_2O_8$ | 6 g. | — |
| $Ce^{IV}(NH_4)_2N_2O_8$ | — | 6 g. |

After removal from the oxidant solutions, the strips were rinsed in deionized water and dried in an isothermal oven at 120° F. for 1 Hour. Surface resistivities using a two-point probe method were made as well as visual observations with respect to color and clarity (Tables 6 and 7).

TABLE 6

Oxident Solution I - Ammonium persulfate
Time/Visual/Resistivity

| Time | #1 | #2 | #3 | #4 |
|---|---|---|---|---|
| 30 Min. | Lt. Grn./— | V. Lt. Grn./1.5 E7 | V. Lt. Grn./— | V. Lt. Grn./2.0 E9 |
| 1 Hr. | Md. Grn./5.0 E6 | Cld. Wht./— | Lt. Grn./1.5 E9 | V. Lt. Grn./— |
| 1.5 Hr. | Dk. Grn./1.3 E6 | Cld. Wht./— | Lt. Grn./5.0 E6 | V. Lt. Grn./— |

TABLE 6-continued

Oxident Solution I - Ammonium persulfate
Time/Visual/Resistivity

| Time | #1 | #2 | #3 | #4 |
|---|---|---|---|---|
| 2.0 Hr. | V. Dk. Grn./ 1.3 E6 | Cld. Wht./— | Lt. Grn./1.3 E6 | Lt. Grn./ 1.0 E8 |

Lt. = Light, V. = Very, Grn = Green, Md. = Medium, Cld. = Cloudy, Dk. = Dark
1.0 E6 = 1.0 × 10⁶ Ohms/Sq., —≧ 1.0 × 10¹⁰ Ohms/Sq.

TABLE 7

Oxident Solution II - Ceric Ammonium Nitrate
Time/Visual/Resistivity

| Time | #1 | #2 | #3 | #4 |
|---|---|---|---|---|
| 30 Min. | Cld. Lt. Grn./ 2.0 E9 | V. Lt. Rst./— | Lt. Grn./1.0 E6 | Clr./— |
| 1 Hr. | Cld. Grn./1.0 E6 | Lt. Rst./— | Lt. Grn./1.0 E9 | V. Lt. Grn./ 2.5 E9 |
| 1.5 Hr. | Cld. Dk. Grn./ 1.0 E6 | Rst. Grn./— | V. Lt. Grn./ 1.5 E6 | V. Lt. Grn./— |
| 2.0 Hr. | V. Dk. Grn./ 1.3 E6 | Cld. Rst./ 1.3 E9 | V. Lt. Grn./ 1.0 E6 | Clr./— |

Lt. = Light, V. = Very, Grn = Green, Md. = Medium, Cld. = Cloudy, Dk. = Dark, Rst. = Rust, Clr. = Clear
1.0 E6 = 1.0 × 10⁶ Ohms/Sq., —≧ 1.0 × 10¹⁰ Ohms/Sq.

The same strips were then placed in a humidity controlled dry box (ETS Systems, electronically controlled humidity) at 10% relative humidity for 24 Hrs. After which time the surface resistivities were determined again (Tables 8 and 9).

TABLE 8

Oxidant Solution I - Ammonium persulfate
After 24 Hrs. at 10% R.H.

| Time | #1 | #2 | #3 | #4 |
|---|---|---|---|---|
| 30 Min. | Lt. Grn./— | V. Lt. Grn./ 1.0 E7 | V. Lt. Grn./— | V. Lt. Grn./— |
| 1 Hr. | Md. Grn./8.0 E6 | Cld. Wht./— | V. Lt. Grn./ 2.0 E8 | V. Lt. Grn./— |
| 1.5 Hr. | Dk. Grn./1.3 E6 | Cld. Wht./— | Lt. Grn./1.5 E7 | V. Lt. Grn./ 2.5 E9 |
| 2.0 Hr. | V. Dk. Grn./1.3 E6 | Cld. Wht./— | Lt. Grn./1.0 E6 | Lt. Grn./ 1.0 E8 |

Lt. = Light, V. = Very, Grn = Green, Md. = Medium, Cld. = Cloudy, Dk. = Dark, Clr. = Clear, Rst = Rust
1.0 E6 = 1.0 × 10⁶ Ohms/Sq., —≧ 1.0 × 10¹⁰ Ohms/Sq.

TABLE 9

Oxidant Solution II - Ceric Ammonium Nitrate
After 24 Hrs. at 10% R.H.

| Time | #1 | #2 | #3 | #4 |
|---|---|---|---|---|
| 30 Min. | Cld. Lt. Grn./ 6.0 E8 | V. Lt. Rst./ Rst. | Lt. Grn./1.0 E6 | Clr./— |
| 1 Hr. | Cld. Grn./1.0 E6 | Lt. Rst./— | Lt. Grn./1.0 E6 | V. Lt. Grn./ 1.0 E9 |
| 1.5 Hr. | Cld. Drk. Grn./ 1.0 E6 | Rst. Grn./— | V. Lt. Grn./ 1.3 E6 | V. Lt. Grn./— |
| 2.0 Hr. | V. Dk. Grn./3.5 E6 | Cld. Rst./— | V. Lt. Grn./ 1.0 E6 | Clr./— |

Lt. = Light, V. = Very, Grn = Green, Md. = Medium, Cld. = Cloudy, Dk. = Dark, Clr. = Clear, Rst. = Rust
1.0 E6 = 1.0 × 10⁶ Ohms/Sq., —≧ 1.0 × 10¹⁰ Ohms/Sq.

As indicated above, results comparable to those achieved above with PETG can be achieved with other thermoplastic substrates formed of resins such as PVC, polycarbonate, Nylon 6, and various acrylic polymers. When this method is used with polymers other than PETG, it is appropriate to use different isomers of aniline or different isomers of self-doping aniline (i.e. contain a sulfonic acid group or carboxyl group), or either of the previous examples can be blended in different proportions with the parent aniline compound. Some examples are shown below.

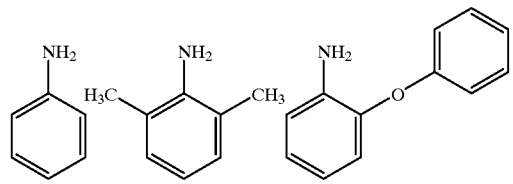

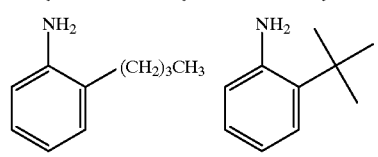

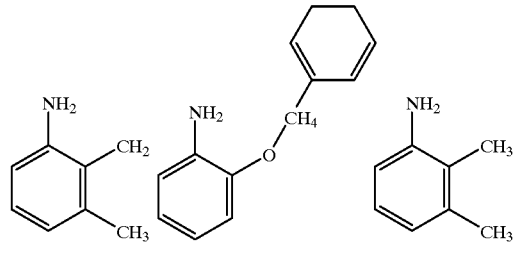

Neutral Alkylated Aniline Monomers

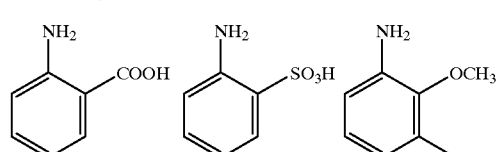

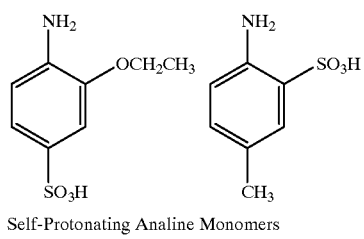

Self-Protonating Analine Monomers

Solubility in various plastic matrices can also be controlled by varying the counter ion used for doping. Inorganic ions (i.e. hard ions) such as chloride, bromide, iodide, perchlorate, triflate, and the like tend to impair the solubility in most common organic solvents and non-polar to moderately polar plastics. However, when counter ions with alkyl or aromatic functionality are used, the solubility is greatly increased in most plastics. In these instances, "soft" anions tend to act as plasticizers as well as increasing the polymer's heat stability. The following structural formulas illustrate some examples of "softer" counter ions.

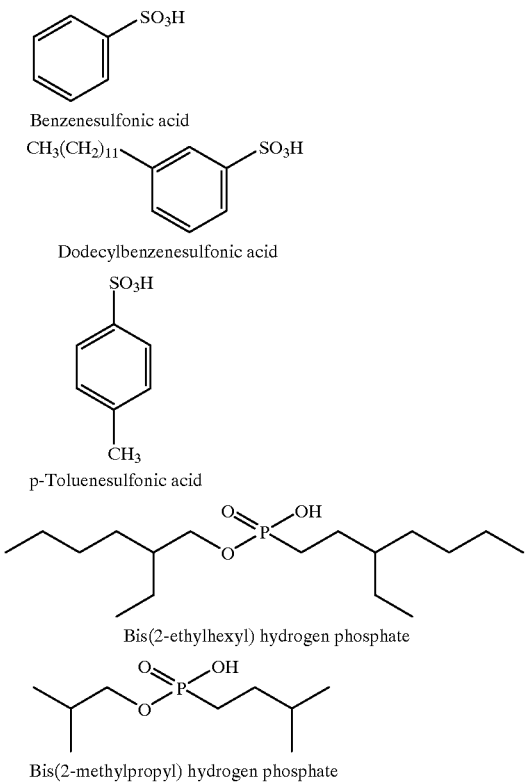

Benzenesulfonic acid

Dodecylbenzenesulfonic acid p-Toluenesulfonic acid

Bis(2-ethylhexyl) hydrogen phosphate

Bis(2-methylpropyl) hydrogen phosphate

As noted previously, it is preferred in employing the present invention to affect the polymerization (including partial polymerization) of the aniline segments by the provision of an oxidizing environment. This is readily accomplished by immersing the aniline-infused substrate materials in a solution of oxidizing agent. The typical immersion times can range from about 2 minutes at an elevated temperature of 54° C. to times ranging up to 15–30 minutes at room temperature of about 25° C. Specific applications of this technique involve immerging the aniline-fused substrate in the oxidizing solution at a pH within the range of about 0.5–1.5 for a period of time ranging from about 8–20 minutes. While the provision of an oxidizing environment to effect polymerization of the aniline segments is preferred, polymerization of the aniline segments can be accomplished by other suitable means, specifically through the application of energy by electromagnetic radiation. Specifically, electromagnetic radiation in the ultraviolet range may be employed to effect polymerization of the aniline-segments without affecting substantial cross-linking of the polymeric matrix of the substrate material so that what remains is essentially thermoplastic. In effecting polymerization or partial polymerization of the aniline segments through the application of ultraviolet light, a suitable procedure involves an infusion procedure as described above but with the use of a photoinitiator in the infusion procedure. This can be accomplished by modifying the infusion procedure so that it involves infusion of a photoinitiator such as benzophenone and dibenzyl ketal along with methane sulfonic acid as a dopant. Subsequent to the infusion procedure, the PETG substrate material in this exposed to ultraviolet radiation in the 310 nm–460 mm wavelength range. This step can be carried out with ultraviolet radiation at an intensity within the range of 200–400 nw/cm$^2$. In addition, time can range from about 5 seconds up to about one minute.

While glycol-modified polyethylene terephthalate is especially preferred in carrying out the present invention because of its optical properties and its ready application in shrink wrappage applications, various other polymer systems can be used in carrying out the present invention. As noted previously, these include polyamide resins, such as Nylon 6, polyvinyl chloride, polycarbonate resins, and polyacrylonitrile resins.

Having described specific embodiments of the present invention, it will be understood that modifications thereof may be suggested to those skilled in the art, and it is intended to cover all such modifications as fall within the scope of the appended claims.

What is claimed:

1. In a process for the preparation of a static dissipative material, the steps comprising:
   (a) providing a solid substrate material formed of a thermoformable polymeric matrix of low electrical conductivity;
   (b) contacting said substrate material with a dispersion of an aniline-based monomeric or oligomeric conductant comprising a substituted aniline constituent functionalized with at least one substituent selected from the group consisting of an ionic group, an alkoxy group, and an aryloxy group in a lipophilic or amphophilic solvent;
   (c) maintaining said dispersion in contact with said solid substrate material for a period sufficient to permit at least partial infusion of said aniline-based conductant into said polymeric matrix;
   (d) subsequent to step (c), subjecting said solid substrate material containing the infused aniline-based conductant to an oxidizing environment for a period of time sufficient to provide a substrate material of enhanced electrical conductivity.

2. The process of claim 1 wherein said substrate material provided in step (a) exhibits a surface resistivity of more than $1 \times 10^9$ ohms/sq. and the surface resistivity of said substrate material at the conclusion of step (d) is no more than $1 \times 10^8$ ohms/sq.

3. The method of claim 1 further comprising the step subsequent to step (c) and prior to step (d), drying said substrate material for a period of time sufficient to remove residual solution from the surface thereof and thereafter conducting step (d).

4. The method of claim 3 wherein step (c) is carried out by placing said substrate material in contact with an aqueous solution of an oxidant.

5. The method of claim 1 wherein said aniline constituent is functionalized to enhance the disperability of said aniline constituent in the said solvent.

6. The method of claim 5 wherein said solvent is a lipophilic solvent and said aniline constituent is functionalized with at least one $C_1$–$C_4$ hydrocarbyl group in addition to said substituent recited in step (b) of claim 1.

7. The method of claim 1 wherein said aniline constituent is functionalized with an anionic group selected from the group consisting of a sulfonate group, a phosphonate group and a carboxylate group.

8. The method of claim 7 wherein said aniline constituent is functionalized with said anionic group and a $C_1$–$C_4$ alkyl group which enhances the solubility of said aniline constituent into said polymeric matrix.

9. The method of claim 1 wherein said substrate material is a thermoformable film having a thickness within the range of 10–40 mils.

10. The method of claim 1 wherein said substrate material is formed of a thermoplastic polymer selected from the group consisting of polyethylene terephthalate, glycol-modified polyethylene terephthalate, polyvinyl chloride, polyacrylonitrile resin, polycarbonate resin, and polyamide resin.

11. The method of claim 10 wherein said substrate material is a flexible film formed of glycol-modified polyethylene terephthalate and wherein said substrate material is immersed in said solution of said aniline constituent.

12. The method of claim 11 wherein said aniline constituent is functionalized with at least one substituent selected from the group consisting of an ionic group, a hydrocarbon group, an alkoxy group, an aryloxy group, and mixtures thereof.

13. In a process for the preparation of a static dissipative material, the steps comprising:
 (a) providing a solid substrate material formed of a thermoformable polymeric matrix of low electrical conductivity, said substrate material comprising a thermoformable film having a thickness within the range of 10–40 mils;
 (b) contacting said substrate material with a dispersion of an aniline-based monomeric or oligomeric conductant selected from the group consisting of aniline and substituted aniline in a lipophilic or amphophilic solvent;
 (c) maintaining said dispersion in contact with said solid substrate material for a period sufficient to permit at least partial infusion of said aniline-based conductant into said polymeric matrix;
 (d) subsequent to step (c), subjecting said solid substrate material containing the infused aniline-based conductant to an oxidizing environment for a period of time sufficient to provide a substrate material of said thermoformable film of enhanced electrical conductivity; and
 (e) at least partially enclosing an electronic component in said thermoformable film, heating said film, and allowing said film to cool to provide a shrink-wrapped electronic component.

14. In a process for the preparation of a static dissipative material, the steps comprising:
 (a) providing a solid substrate material formed of a thermoformable polymeric matrix of low electrical conductivity;
 (b) contacting said substrate material with a dispersion of an aniline-based monomeric or oligomeric conductant comprising a dialkyl aniline constituent in a lipophilic solvent;
 (c) maintaining said dispersion in contact with said solid substrate material for a period sufficient to permit at least partial infusion of said aniline-based conductant into Said polymeric matrix; and
 (d) subsequent to step (c), subjecting said solid substrate material containing the infused aniline-based conductant to an oxidizing environment for a period of time sufficient to provide a substrate material of enhanced electrical conductivity.

15. The method of claim 14 wherein each of the alkyl substituents of said dialkyl analine constituent is a $C_1$–$C_4$ alkyl group.

16. The method of claim 15 wherein said dialkyl analine constituent is 2,3 dimethyl aniline.

* * * * *